United States Patent
Sethuraman

(10) Patent No.: US 9,654,791 B1
(45) Date of Patent: May 16, 2017

(54) SYSTEM AND METHOD FOR EFFICIENT MULTI-BITRATE AND MULTI-SPATIAL RESOLUTION MEDIA ENCODING

(71) Applicant: ITTIAM SYSTEMS (P) LTD., Bangalore (IN)

(72) Inventor: Sriram Sethuraman, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 0 days.

(21) Appl. No.: 15/369,898

(22) Filed: Dec. 6, 2016

Related U.S. Application Data

(62) Division of application No. 14/064,224, filed on Oct. 28, 2013, now Pat. No. 9,554,143.

(30) Foreign Application Priority Data

Oct. 26, 2012 (IN) .......................... 4480/CHE/2012

(51) Int. Cl.
| | |
|---|---|
| *H04N 7/12* | (2006.01) |
| *H04N 11/02* | (2006.01) |
| *H04N 19/513* | (2014.01) |
| *H04N 19/61* | (2014.01) |
| *H04N 19/124* | (2014.01) |
| *H04N 19/105* | (2014.01) |
| *H04N 19/172* | (2014.01) |
| *H04N 19/96* | (2014.01) |
| *H04N 19/176* | (2014.01) |
| *H04N 19/184* | (2014.01) |

(52) U.S. Cl.
CPC ......... *H04N 19/513* (2014.11); *H04N 19/105* (2014.11); *H04N 19/124* (2014.11); *H04N 19/61* (2014.11); *H04N 19/172* (2014.11); *H04N 19/176* (2014.11); *H04N 19/184* (2014.11); *H04N 19/96* (2014.11)

(58) Field of Classification Search
CPC ........................... H04N 19/513; H04N 19/105
See application file for complete search history.

(56) References Cited

U.S. PATENT DOCUMENTS

| | | | |
|---|---|---|---|
| 2011/0305273 A1* | 12/2011 | He ...................... | H04N 19/436 375/240.02 |
| 2012/0287092 A1* | 11/2012 | Tatara .................. | G09G 3/3233 345/204 |

* cited by examiner

*Primary Examiner* — Hung Dang
*Assistant Examiner* — Girumsew Wendmagegn
(74) *Attorney, Agent, or Firm* — Prakash Nama; Global IP Services, PLLC

(57) ABSTRACT

In one example, a sequence of pictures may be transformed at a given spatial resolution to a plurality of output spatial resolutions and/or an additional spatial resolution that is lower than the plurality of output spatial resolutions. The sequence of pictures and a picture type may be received for each of the pictures at respective output spatial resolutions. Estimating a set of combinations of encoding parameters for coding tree blocks (CTBs) in each of the pictures at a lowest output spatial resolution or mapping combinations of encoding parameters for each CTB in each of the pictures at an immediate coarser spatial resolution to corresponding blocks at the respective output spatial resolution is performed. A set of combinations of encoding parameters may be determined for each CTB and best combinations of encoding parameters from the determined set of combinations may be identified for encoding the sequence of pictures.

16 Claims, 11 Drawing Sheets

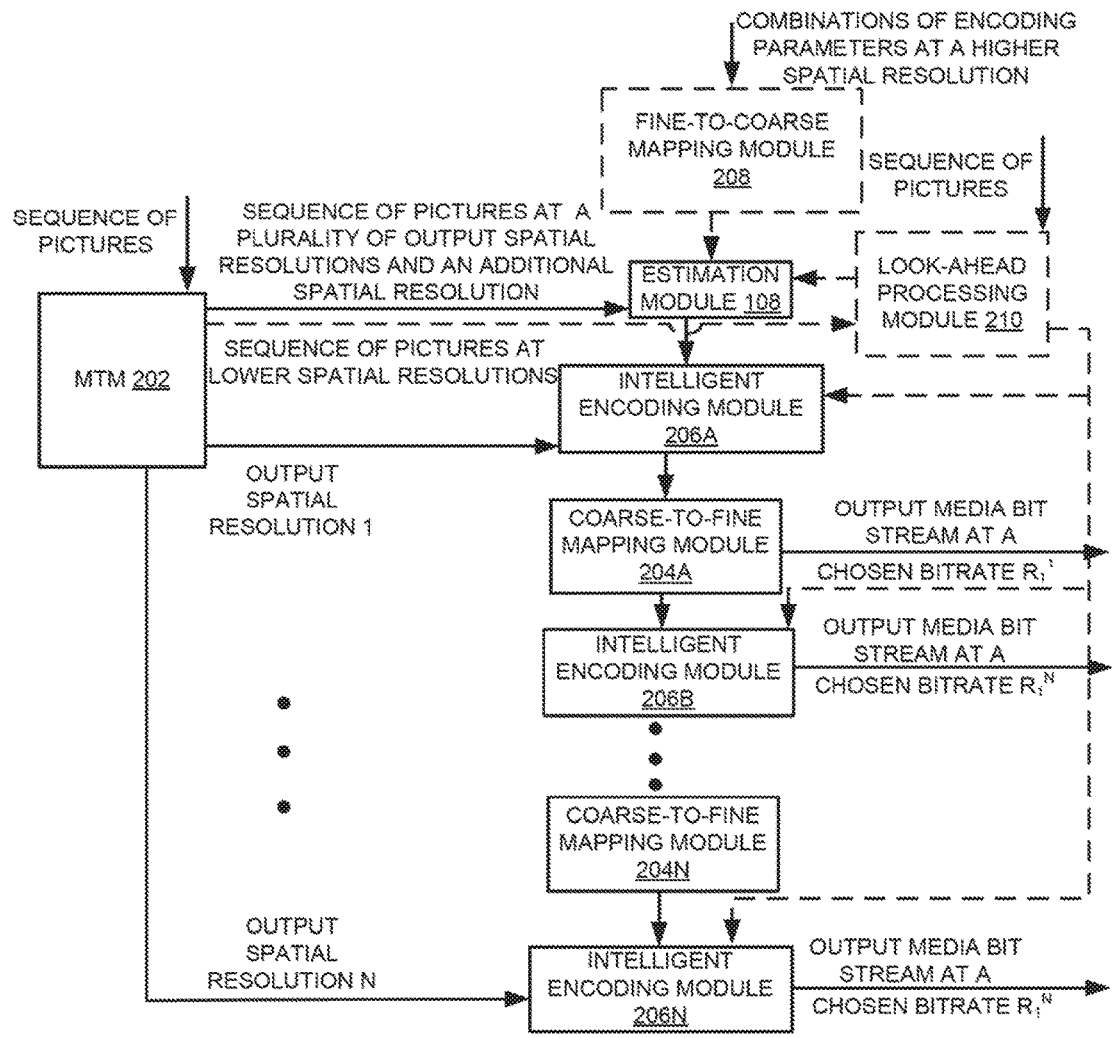
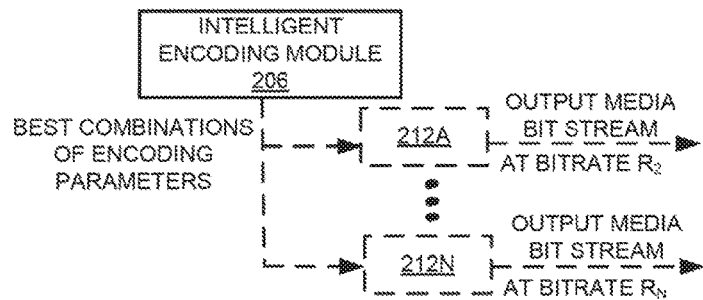
FIG. 2
FIG. 2A

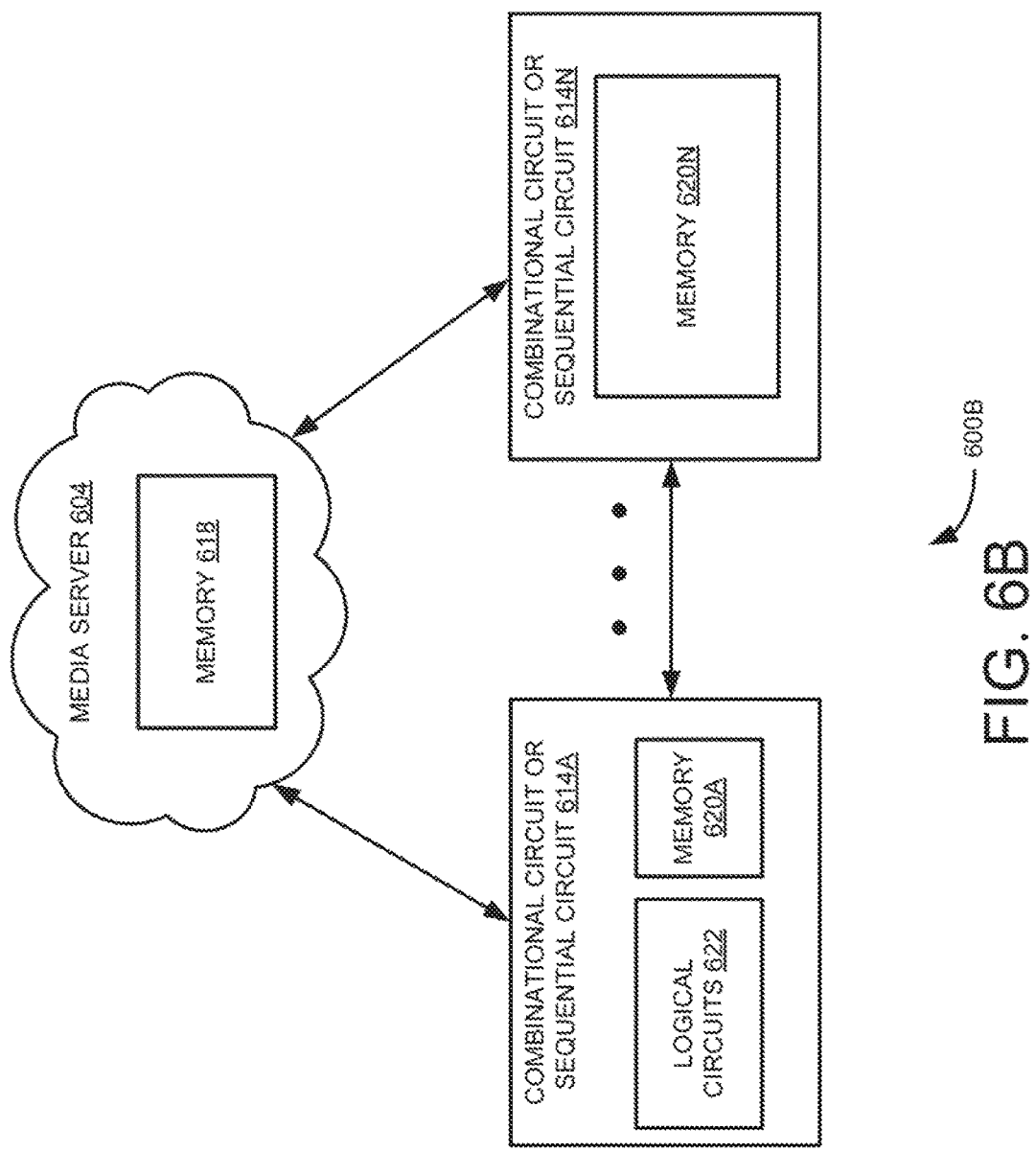

SYSTEM AND METHOD FOR EFFICIENT MULTI-BITRATE AND MULTI-SPATIAL RESOLUTION MEDIA ENCODING

This is a divisional patent application of co-pending application serial number U.S. Ser. No. 14/064,224 entitled "SYSTEM AND METHOD FOR EFFICIENT MULTI-BITRATE AND MULTI-SPATIAL RESOLUTION MEDIA ENCODING", filed on Oct. 28, 2013, which claims the benefit under 35 U.S.C 119(a) to Indian Provisional Patent Application Ser. No. 4480/CHE/2012 entitled "SYSTEM AND ARCHITECTURE FOR EFFICIENT MULTI-RESOLUTION MULTI-BITRATE MEDIA TRANSCODING" by Ittiam Systems (P) Ltd. filed on Oct. 26, 2012.

FIELD OF TECHNOLOGY

Embodiments of the present invention relate to media encoding. More particularly, embodiments of the present invention relate to efficient multi-bitrate and multi-spatial resolution media encoding.

BACKGROUND

Generally, media streams are encoded or compressed in a certain encoding format prior to transmission of the media streams over a network. Typical encoding for hypertext transfer protocol (HTTP) based adaptive streaming technology requires producing multiple bitrate streams from a single input media to allow adaptation to changing bandwidth during content delivery (e.g., dynamic adaptive streaming over HTTP or DASH). Further, for end devices having varying screen resolutions, the encoding service produces media streams of multiple spatial resolutions, such as a quarter video graphics array (QVGA), a half-size video graphics array (HVGA), a video graphics array (VGA), a wide video graphics array (WVGA), 720p, 1080p/i, and so on. The process of encoding can be performed using on a public cloud infrastructure or a private cloud infrastructure using software-based or custom hardware appliances.

Given the slew of output media streams to be produced from a single input media, it is important to consider an efficient means of encoding. Newer video coding standards, such as high efficiency video coding (HEVC) require a much higher computational complexity compared to older video coding standards, and, therefore, efficient encoding becomes even more critical to help keep encoding costs lower. There are existing methods that leverage the information in the input encoded media bit-stream to influence the encoding. However, as the input media stream is at a high resolution, the information contained in it is not that useful for coding the lower resolution streams. Also, given the coding tool differences between input formats and the output formats, optimal rate-distortion performance with the output formats may not be possible with re-use. For example, coding tools in standards such as H.264 or HEVC (High Efficiency Video Coding) have features such as, weighted prediction, hierarchical group of pictures (GOP) structure, multiple reference motion estimation (ME), and the like, whereas older standards such as, MPEG-2 (Moving Pictures Expert Group-2) do not have the above mentioned features. While some encoders (such as the open-source x264 encoder) leverage first pass information in terms of look-ahead processing and GOP structure when encoding multiple bitrate streams at a given spatial resolution, they still treat each encoding instance independently and repeat a lot of encoding parameters estimation process for each instance, which results in nearly a linear increase in computational complexity with the number of output bitrates.

BRIEF DESCRIPTION OF THE DRAWINGS

Embodiments of the present invention are illustrated by way of an example and not limited to the figures in the accompanying drawings, in which like references indicate similar elements and in which:

FIG. 2 illustrates an architecture for encoding a sequence of pictures at a given spatial resolution to an encoding format at a plurality of output spatial resolutions, according to one embodiment;

FIG. 2A is a block diagram illustrating an intelligent encoding module, such as one shown in FIG. 2, coupled to a plurality of normative encoding modules for encoding the sequence of pictures to the encoding format at a plurality of output bit rates, according to one embodiment;

FIGS. 6A-6B are systems for performing efficient media encoding, according to two different embodiments.

Other features of the present embodiments will be apparent from the accompanying drawings and from the detailed description that follows.

DETAILED DESCRIPTION

A system and method for efficient multi-bitrate and multi-spatial resolution media encoding are disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1A:
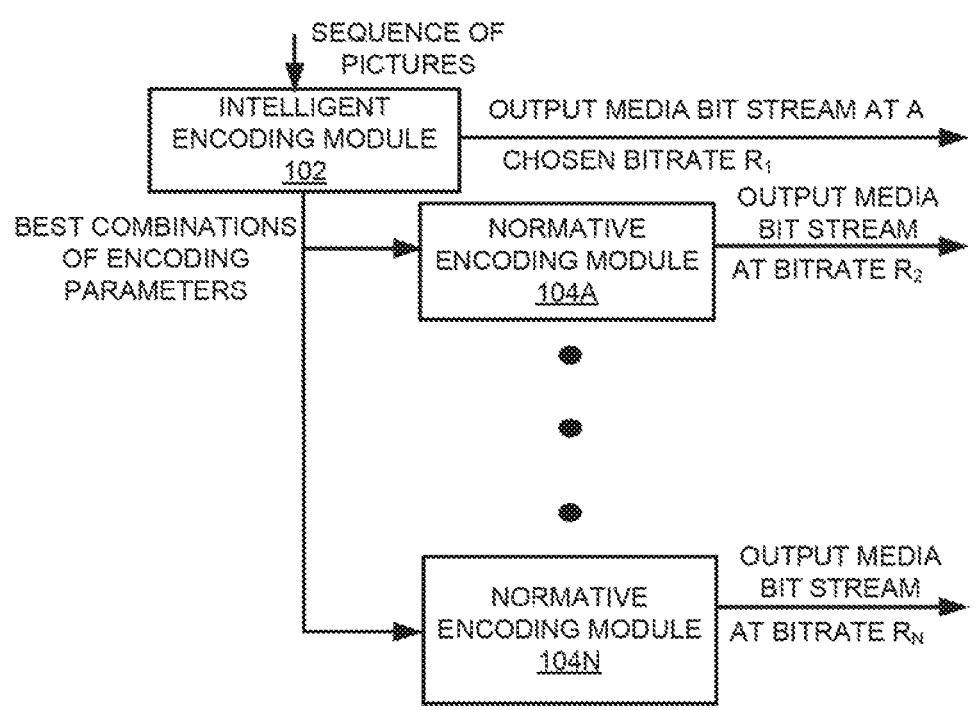
FIG. 1A illustrates an architecture for efficiently encoding a sequence of pictures at a given spatial resolution to an encoding format at a plurality of output bitrates, according to one embodiment.

FIG. 1A illustrates an architecture 100A for efficiently encoding a sequence of pictures at a given spatial resolution to an encoding format at a plurality of output bitrates, according to one embodiment. As shown in FIG. 1A, the architecture 100A includes an intelligent encoding module 102 and a set of normative encoding modules 104A-N. Further, the intelligent encoding module 102 is coupled to the normative encoding modules 104A-N.

Figure 4A:
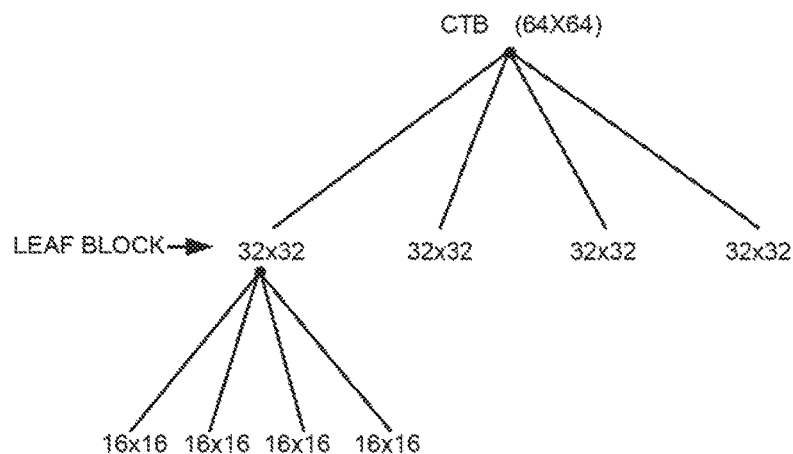
FIGS. 4A-4B are block diagrams illustrating a coding tree and a coding tree block (CTB), respectively, in the context of the present invention.
Figure 4B:
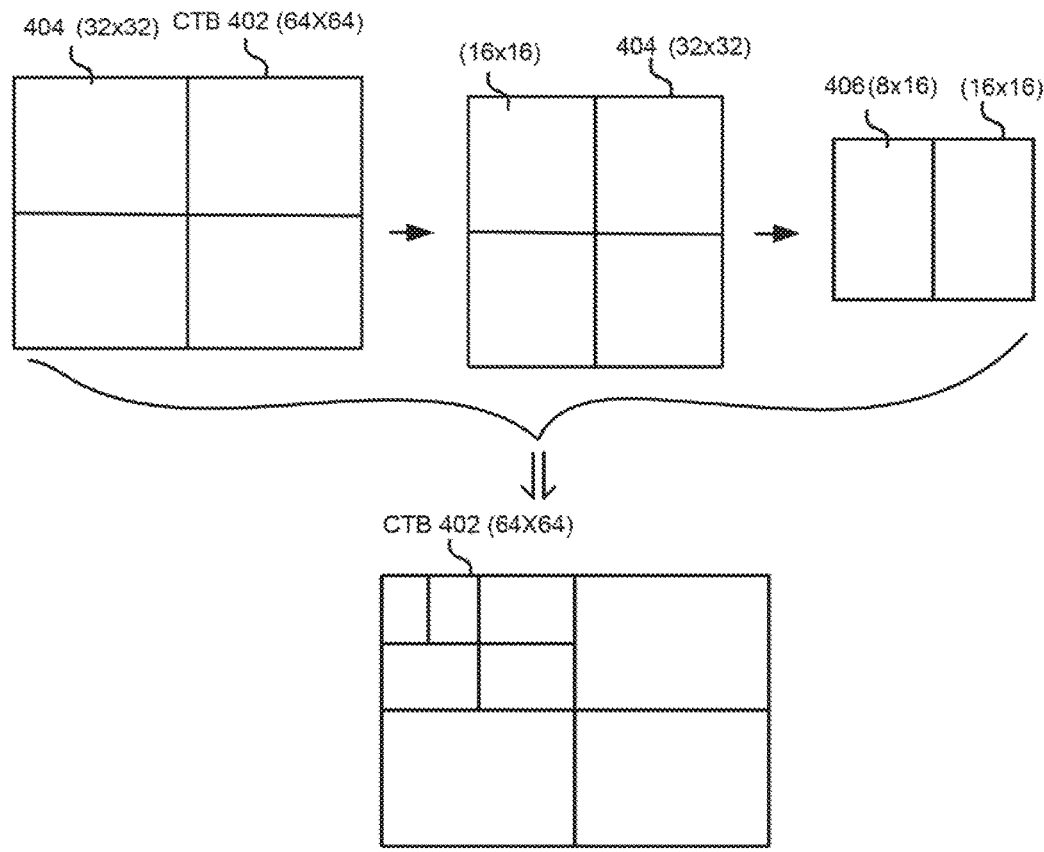

In operation, the intelligent encoding module 102 receives the sequence of pictures. Further, the intelligent encoding module 102 can optionally determine a picture type for each of the pictures or receive the picture type for each of the pictures. The intelligent encoding module 102 then identifies best combinations of encoding parameters from a determined set of combinations of encoding parameters for each coding tree block (CTB) in each of the pictures supported by the encoding format for the associated picture type. For example, a combination of encoding parameters for each CTB in each of the pictures is composed of one or more of, coding tree structure options, a prediction type of each leaf block of each coding tree option, a partition type of each leaf block of each coding tree option, a prediction mode within the prediction type for each partition of each leaf block partition of each coding tree option, motion vectors with respect to a set of reference pictures for each leaf block of each coding tree option, and a transform tree for each leaf block or leaf block partition of each coding tree option. An example coding tree 400A is shown in FIG. 4A, the corresponding coding tree block 402, an example leaf block 404, and an example leaf block partition 406 are shown in FIG. 4B.

In one embodiment, the intelligent encoding module 102 evaluates a cost function that depends on one of the output bitrates for each combination of encoding parameters in the determined set of combinations of encoding parameters for each CTB in each of the pictures supported by the encoding format for the associated picture types. For example, the cost function can be evaluated in terms of one or more of, input distortion to encoder (such as sum of absolute of the residuals being encoded in either the spatial domain or a transform domain), output distortion of encoder (such as sum of squared error between the original samples and the reconstructed samples), partial estimated or actual rate (such as number of bits to encode the non-residual elements of the bit stream), and estimate or actual rate (i.e. total number of bits required to encode including residuals). In this embodiment, the intelligent encoding module 102 then identifies the best combinations of encoding parameters for each CTB in each of the pictures from the determined set of combinations of encoding parameters based on the evaluated cost function.

Moreover in operation, the intelligent encoding module 102 encodes the pictures in the encoding format based on the best of the identified combinations of encoding parameters for each CTB in each of the pictures to create a media bit stream at the one of the output bitrates. For example, components residing in the intelligent encoding module 102 are explained in more detail with reference to FIG. 3A.

In addition, the normative encoding modules 104A-N, one for each of remaining output bitrates, each of which receives the sequence of pictures, their determined picture types, and the identified best combinations of encoding parameters for each CTB in each of the pictures from the intelligent encoding module 102. Each of the normative encoding modules 104A-N then encodes the sequence of pictures using one combination of encoding parameters derived using the identified best combinations of encoding parameters for each CTB in each of the pictures to create a media bit stream at respective one of the remaining output bitrates. In one embodiment, each of the normative encoding modules 104A-N re-evaluates the cost function that is dependent on respective one of the remaining output bitrates for a set of combinations of encoding parameters derived using the identified best combinations of encoding parameters for each CTB in each of the pictures to determine the one combination of encoding parameters used for encoding each CTB in each of the pictures at the respective one of the remaining output bitrates. Each of the normative encoding modules 104A-N then encodes the sequence of pictures based on the one of the best combinations of encoding parameters for each CTB in each of the pictures to create the media bit stream at respective one of the remaining output bitrates.

In one example implementation, each of the normative encoding modules 104A-N performs motion compensation or intra prediction and implements entire encoding loop (residual computation, forward transform, quantization (simple or RD-optimized), inverse quantization, and/or inverse transform, reconstruction). Each of the normative encoding modules 104A-N also performs entropy coding. Without loss of generality, each of the normative encoding modules 104A-N also includes in-loop filtering functionality, such as deblocking, sample adaptive offset, adaptive loop filtering, and so on. This is explained in more detail with reference to FIG. 3B.

Figure 1B:
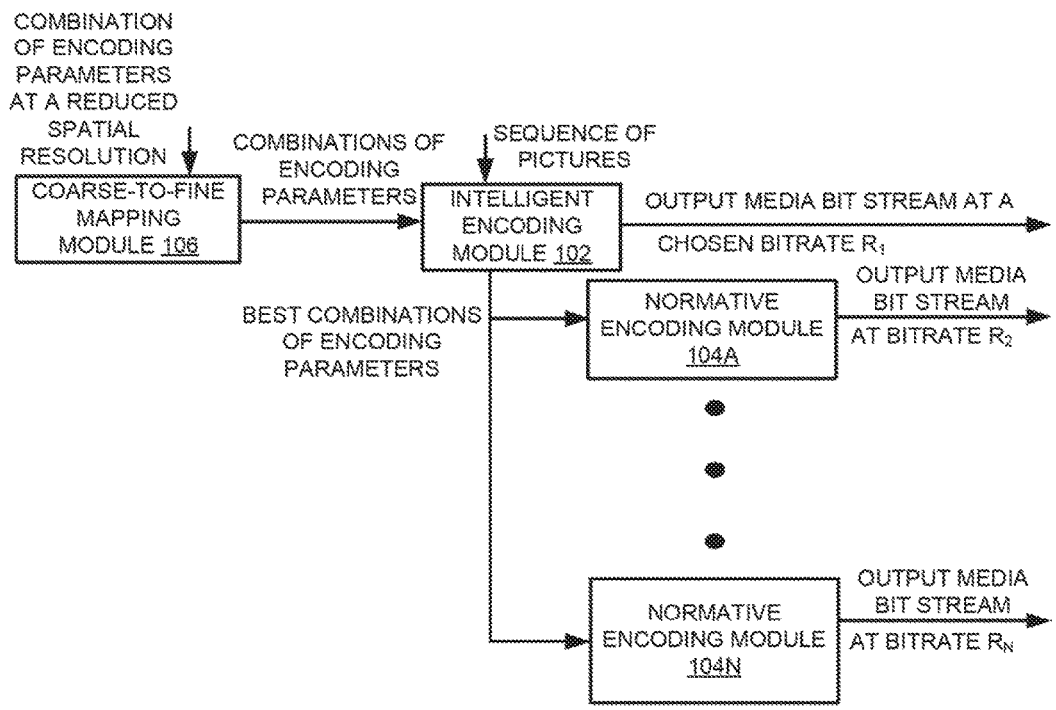
FIGS. 1B-1D illustrate architectures for efficiently encoding the sequence of pictures at the given spatial resolution to the encoding format at the plurality of output bitrates, according to three different embodiments, respectively.

FIG. 1B illustrates an architecture 100B for efficiently encoding the sequence of pictures at the given spatial resolution to the encoding format at a plurality of output bitrates, according to one embodiment. As shown in FIG. 1B, the architecture 100B includes the intelligent encoding module 102 and the normative encoding modules 104A-N and a coarse-to-fine mapping module 106. Further, the coarse-to-fine mapping module 106 is coupled to the intelligent encoding module 102. Furthermore, the intelligent encoding module 102 is coupled to the normative encoding modules 104A-N.

In operation, the coarse-to-fine mapping module 106 receives combinations of encoding parameters for each CTB in each of the pictures at a reduced spatial resolution version derived from the sequence of pictures at a given spatial resolution and maps them to corresponding blocks at the given spatial resolution than this reduced spatial resolution.

Further, the intelligent encoding module 102 receives the sequence of pictures and the mapped outputs from the coarse-to-fine mapping module 106 and determines a set of combinations of encoding parameters supported by the encoding format for each CTB in each of the pictures by using the mapped outputs of the coarse-to-fine mapping module 106. Furthermore, the intelligent encoding module 102 can optionally determine a picture type for each of the pictures or receive the picture type for each of the pictures. The intelligent encoding module 102 then identifies best combinations of encoding parameters for each CTB in each of the pictures from the determined set of combinations of encoding parameters supported by the encoding format for the associated picture type.

Also, the intelligent encoding module 102 encodes the pictures based on the best of the identified combinations of encoding parameters for each CTB in each of the pictures to create the media bit stream at one of the output bitrates. Further, the normative encoding modules 104A-N, one for each of remaining output bitrates, each of which receives the pictures, their determined picture types, and the identified best combinations of encoding parameters for each CTB in each of the pictures from the intelligent encoding module 102. Each of the normative encoding modules 104A-N then encodes the pictures using one combination of encoding parameters derived using the identified best combinations of encoding parameters for each CTB in each of the pictures to create the media bit stream at respective one of the remaining output bitrates. This is explained in more detail with reference to FIG. 1A.

Figure 1C:
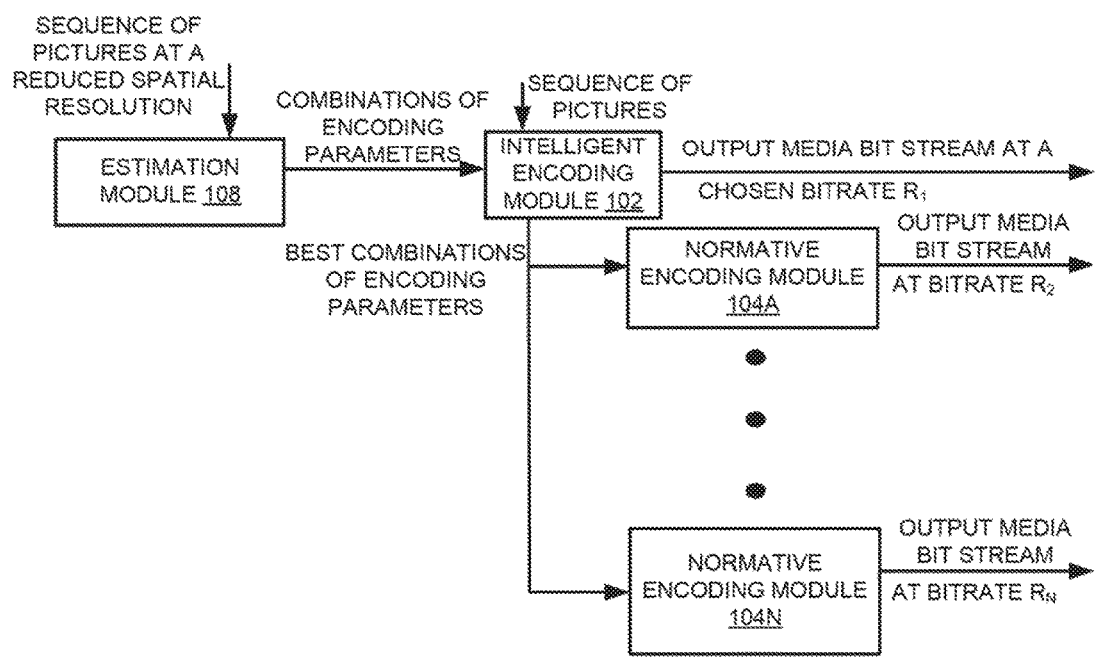

Referring now to FIG. 1C, which is another architecture 100C for efficiently encoding the sequence of pictures at the given spatial resolution to the encoding format at the output bitrates, according to one embodiment. As shown in FIG. 1C, the architecture 100C includes an estimation module 108, the intelligent encoding module 102 and the normative encoding modules 104A-N. Further, the estimation module 108 is coupled to the intelligent encoding module 102. Furthermore, the intelligent encoding module 102 is coupled to the normative encoding modules 104A-N.

In operation, the estimation module 108 receives sequence of pictures at a reduced spatial resolution version and estimates the set of combinations of encoding parameters for the CTBs in each of the pictures at the given spatial resolution based on the reduced spatial resolution version of the sequence of pictures relative to the given spatial resolution. Further, the intelligent encoding module 102 receives the pictures and the estimated set of combinations of encoding parameters for the CTBs in each of the pictures at the given spatial resolution from the estimation module 108. Furthermore, the intelligent encoding module 102 determines the set of combinations of encoding parameters supported by the encoding format for each CTB in each of the pictures using the estimated set of combinations of encoding parameters for the CTBs in each of the pictures at the given spatial resolution received from the estimation module 108. In addition, the intelligent encoding module 102 can optionally determine the picture type for each of the pictures or receive the picture type for each of the pictures. The intelligent encoding module 102 then identifies the best combinations of encoding parameters from the determined set of combinations of encoding parameters for each CTB in each of the pictures supported by the encoding format for the associated picture type.

Also, the intelligent encoding module 102 encodes the pictures based on the best of the identified combinations of encoding parameters for each CTB in each of the pictures to create the media bit stream at one of the output bitrates. Further, the normative encoding modules 104A-N, one for each of remaining output bitrates, each of which receives the pictures, their determined picture types, and the identified best combinations of encoding parameters for each CTB in each of the pictures from the intelligent encoding module 102. Each of the normative encoding modules 104A-N then encodes the pictures using one combination of encoding parameters derived using the identified best combinations of encoding parameters for each CTB in each of the pictures to create the media bit stream at respective one of the remaining output bitrates. This is explained in more detail with reference to FIG. 1A.

Figure 1D:
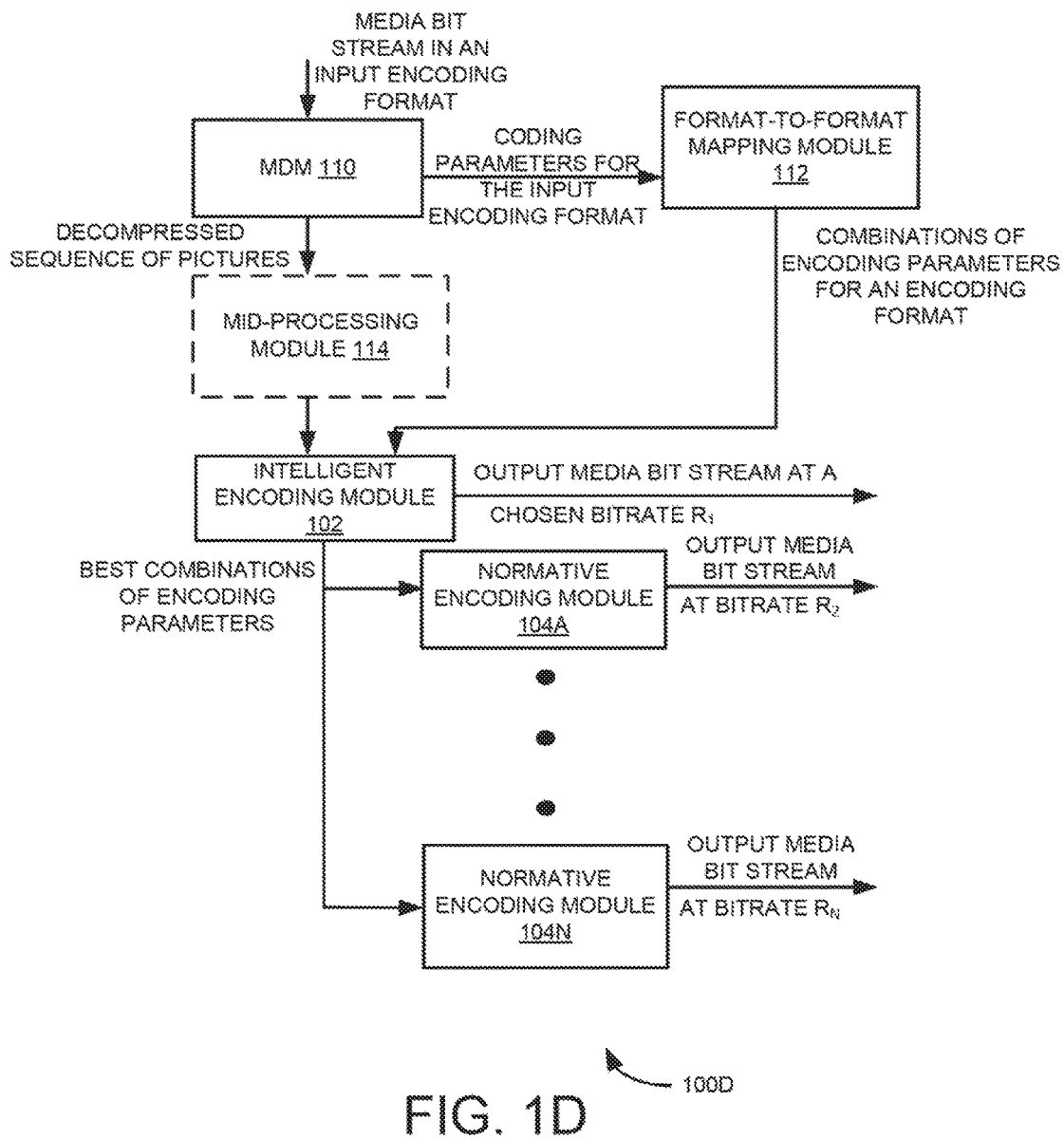

Referring now to FIG. 1D, which is yet another architecture 100D for efficiently encoding a media bit stream at a given spatial resolution to an encoding format at a plurality of output bitrates, according to one embodiment. As shown in FIG. 10D, the architecture 100D includes the intelligent encoding module 102, the normative encoding modules 104A-N, a media decoding module (MDM) 110, a format-to-format mapping module 112. Further, the MDM 110 is coupled to the format-to-format mapping module 112 and the intelligent encoding module 102. Furthermore, the format-to-format mapping module 112 is coupled to the intelligent encoding module 102. In addition, the intelligent encoding module 102 is coupled to the normative encoding modules 104A-N. The architecture 100D also optionally includes a mid-processing module 114 coupled between the MDM 110 and intelligent encoding module 102.

In operation, the MDM 110 receives and decodes the media bit stream in a certain input encoding format to produce decompressed sequence of pictures. The MDM 110 also produces a set of coding parameters in the input encoding format that are obtained while decoding the media stream. For example, the coding parameters is comprised of one or more of the encoding parameters described earlier, and additionally, parameters such as quantization parameter for each leaf block of each coding tree option, number of bits for coding the non-residual syntax elements in the input encoding format, and the number of bits for coding the residual syntax elements in the input encoding format. Further, the format-to-format mapping module 112 receives the coding parameters from the MDM 110 and maps the coding parameters available for each CTB in the sequence of pictures in the certain input encoding format to a set of encoding parameters supported by the encoding format. Further, the intelligent encoding module 102 receives the decompressed sequence of pictures from the MDM 110 and the mapped outputs of the format-to-format mapping module 112. In one example embodiment, the mid-processing module 114 performs one or more of removing coding artifacts in the decompressed sequence of pictures, de-interlacing the sequence of pictures, and enhancing the decompressed sequence of pictures. The intelligent encoding module 102 receives the sequence of pictures from the mid-processing module 114.

Furthermore, the intelligent encoding module 102 determines the set of combinations of encoding parameters supported by the encoding format for each CTB in each of the pictures using the mapped outputs received from the format-to-format mapping module 112. In addition, the intelligent encoding module 102 can optionally determine the picture type for each of the pictures type or receive the picture type for each of the picture types as an input. The intelligent encoding module 102 then identifies the best combinations of encoding parameters for each CTB in each of the pictures from the determined set of combinations of encoding parameters supported by the encoding format for the associated picture type.

Also, the intelligent encoding module 102 encodes the pictures based on the best of the identified combinations of encoding parameters for each CTB in each of the pictures to create a media bit stream at one of the output bitrates. Further, the normative encoding modules 104A-N, one for each of remaining output bitrates, each of which receives the pictures, their determined picture types, and the identified best combinations of encoding parameters for each CTB in each of the pictures from the intelligent encoding module 102. Each of the normative encoding modules 104A-N then encodes the pictures using one combination of encoding parameters derived using the identified best combinations of encoding parameters for each CTB in each of the pictures to create a media bit stream at respective one of the remaining output bitrates. This is explained in more detail with reference to FIG. 1A.

Referring now to FIG. 2, which is an architecture 200 for encoding a sequence of pictures at a given spatial resolution to an encoding format at a plurality of output spatial resolutions, according to one embodiment. As shown in FIG. 2, the architecture 200 includes a media transformation module (MTM) 202, the estimation module 108, a set of coarse-to-fine mapping modules 204A-N, one for each of the output spatial resolutions other than a lowest spatial resolution of the output spatial resolutions, and a set of intelligent encoding modules 206A-N, one for each of the output spatial resolutions.

Further, the MTM 202 is coupled to the estimation module 108 and the intelligent encoding modules 206A-N. Furthermore, each of the coarse-to-fine mapping modules 204A-N is coupled to respective one of the intelligent encoding modules 206A-N. The architecture 200 also optionally includes a fine-to-coarse mapping module 208 that is coupled to the estimation module 108. Further, the architecture 200 optionally includes a look-ahead processing module 210 that is coupled to the estimation module 108 and the intelligent encoding modules 206A-N.

In operation, the MTM 202 transforms the sequence of pictures at the given spatial resolution to the output spatial resolutions and/or an additional spatial resolution that is lower than the output spatial resolutions, in one example embodiment, the MTM 202 performs one of resizing to derive sequence of pictures at higher or lower resolution than the given resolution, de-interlacing to convert interlaced to progressive content, cadence generation, frame rate up/down conversion, and the like. In one example, the MTM 202 transforms decompressed pictures at the given spatial resolution to the output spatial resolutions and/or an additional spatial resolution.

Further, the estimation module 108 estimates a set of combinations of encoding parameters for each CTB in each of the pictures at a lowest output spatial resolution among the output spatial resolutions based on the additional spatial resolution. In one example embodiment, the fine-to-coarse mapping module 208 receives combinations of encoding parameters at a higher spatial resolution and provides a set of possible encoding parameters for a corresponding region at the additional spatial resolution to the estimation module 108 using which it estimates the set of combinations of encoding parameters. Furthermore, each of the coarse-to-fine mapping modules 204A-N maps combinations of encoding parameters for each CTB in each of the pictures at an immediate coarser spatial resolution to corresponding blocks at their respective output spatial resolution.

In addition, the intelligent encoding modules 206A-N, one for each of the plurality of output spatial resolutions, each of which receives the sequence of pictures at the respective output spatial resolution and a picture type for each of the pictures. In one example implementation, the look-ahead processing module 210 receives the sequence of pictures at the given spatial resolution or the sequence of pictures at lower spatial resolutions from the MTM 202 and determines group of pictures (GOP) structure and hence the picture type for each of the pictures across all the intelligent encoding modules 206A-N. Each of the intelligent encoding modules 206A-N determines a set of combinations of encoding parameters supported by the encoding format for each CTB in each of the pictures based on the outputs of one or more of the estimation module 108 and the respective one of the coarse-to-fine mapping modules 204A-N. In one example embodiment, when the respective output spatial resolution is lower than the given resolution, each of the intelligent encoding modules 206A-N receives the output of the fine-to-coarse mapping module 208. For example, a combination of encoding parameters for each CTB in each of the pictures is composed of one or more of, coding tree structure options, a prediction type of each leaf block of each coding tree option, a partition type of each leaf block of each coding tree option, a prediction mode within the prediction type for each partition of each leaf block partition of each coding tree option, motion vectors with respect to a set of reference pictures for each leaf block of each coding tree option, and a transform tree for each leaf block or leaf block partition of each coding tree option. An example coding tree 400A is shown in FIG. 4A, the corresponding coding tree block 402, an example leaf block 404, and leaf block partition 406 are shown in FIG. 4B.

Moreover, each of the intelligent encoding modules 206A-N identifies best combinations of encoding parameters from the determined set of combinations of encoding parameters for each CTB in each of the pictures supported by the encoding format for the associated picture type. In one embodiment, the intelligent encoding module 102 evaluates a cost function for each combination of encoding parameters in the set of combinations of encoding parameters for each CTB in each of the pictures supported by the encoding format for the associated picture type. In this embodiment, the intelligent encoding module 102 then identifies the best combinations of encoding parameters from the set of combinations of encoding parameters for each CTB in each of the pictures based on the evaluated cost function. Also in operation, each of the intelligent encoding modules 206A-N encodes the pictures in the encoding format based on the best of the identified combinations of encoding parameters for each CTB in each of the pictures to create a media bit stream at the respective output spatial resolution.

In one example embodiment, an intelligent encoding module 206 (e.g., intelligent encoding modules 206A-N) is coupled to a set of normative encoding modules 212A-N as shown in FIG. 2A. Further, the normative encoding modules 212A-N, one for each of other desired output bitrates at a respective output spatial resolution, each of which receives the sequence of pictures at the respective output spatial resolution, their determined picture types, and the identified best combinations of encoding parameters for each CTB in each of the pictures from the intelligent encoding module 206. Furthermore, each of the normative encoding modules 212A-N encodes the pictures in the encoding format based on one combination of encoding parameters derived using the identified best combinations of encoding parameters for each CTB in each of the pictures to create a media bit stream at the respective desired output bitrate at the respective output spatial resolution.

Figure 3A:
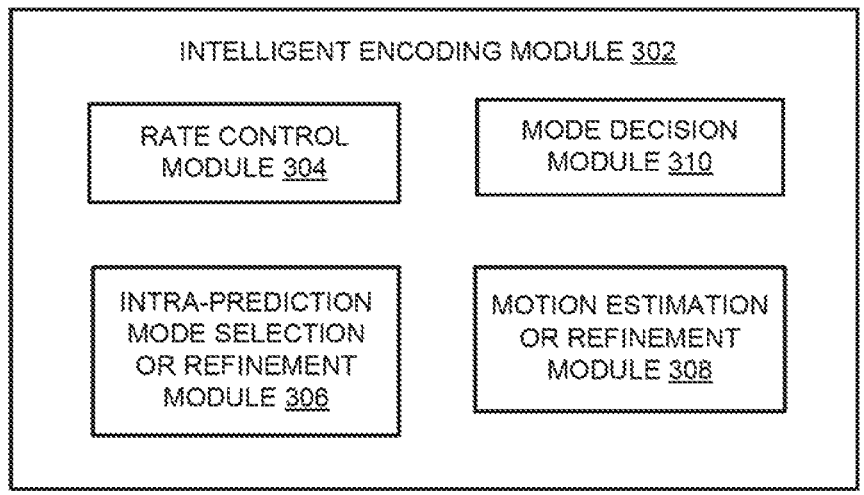
FIG. 3A is a block diagram illustrating components of an intelligent encoding module shown in FIGS. 1A-1D, 2 and 2A, according to one embodiment.

Referring now to FIG. 3A, which is a block diagram 300A illustrating an intelligent encoding module 302 (e.g., one of the intelligent encoding module 102 and the intelligent encoding modules 206A-N shown in FIGS. 1A-1D, 2 and 2A, respectively). As shown in FIG. 3A, the intelligent encoding module 302 includes a rate control module 304, an intra-prediction mode selection or refinement module 306, a motion estimation or refinement module 308 and a mode decision module 310. In one embodiment, the intelligent encoding module 302 at a given spatial resolution includes one or more of the rate control module 304, the intra-prediction mode selection or refinement module 306, and the mode decision module 310.

In one example embodiment, the intelligent encoding module 302 is capable of taking in information from one or more of mapping modules, such as a coarse-to-fine mapping module (e.g., one of the coarse-to-fine mapping module 106 of FIG. 1B and the coarse-to-fine mapping modules 204A-N of FIG. 2), a fine-to-coarse mapping module (e.g., the fine-to-coarse mapping module 208 of FIG. 2) that receives combinations of encoding parameters for each CTB in each of the pictures at a higher spatial resolution and maps the received combinations of encoding parameters to corresponding blocks at the given spatial resolution, an estimation module (e.g., the estimation module 108 of FIGS. 1B and 2), or a format-to-format mapping module that produce outputs in a form suitable for consumption at the given spatial resolution (e.g., the format-to-format mapping module 112 of FIG. 1C), determined picture type for each picture and a set of reference frames for each inter-coded picture along with an associated optional weight and offset for each reference frame for weighted prediction from a look-ahead processing module (e.g., the look-ahead processing module 210 of FIG. 2). Furthermore, the intelligent encoding module 302 produces an optimal encoded bit stream in the encoding format at a bitrate selected amongst the output bitrates at that spatial resolution and provides information input to the coarse-to-fine mapping module at a higher resolution and optionally to other normative encoding modules (e.g., normative encoding modules 104A-N of FIGS. 1A-1D or normative encoding modules 212A-N of FIG. 2A) at the given spatial resolution.

In one example embodiment, the rate control module 304 computes frame level and coding-tree level quantization parameters for the determined picture type of each picture and corresponding to operating bitrate selected for the intelligent encoding module 302 out of the output bitrates. Further, the intra-prediction mode selection or refinement module 306 takes in the combinations of encoding parameters for each CTB in each picture from one or more of the mapping modules, determines a refinement set of combinations of encoding parameters at the given spatial resolution based on the outputs of the mapping modules, evaluates a cost function for each combination of encoding parameters that depends on the computed quantization parameter, and identifies the top few combinations of encoding parameters that have the lowest evaluated cost across the set of combinations of encoding parameters. For example, the encoding parameters relevant for the intra-prediction mode selection or refinement module 306 within the combination of encoding parameters include a coding tree structure, a partition type of each leaf block of the coding tree, an intra prediction mode of each leaf block partition, and a transform tree for each leaf block or leaf block partition.

In one example, the intra-prediction mode selection or refinement module 306 performs the evaluation of cost function by using intra prediction performed using neighboring pixel values in the input sequence of pictures or by using intra prediction performed using neighboring pixel values that are the reconstructed pixel values obtained by quantizing the transformed or non-transformed (intra or inter) prediction residuals for the causal or non-causal neighboring blocks, de-quantizing, inverse transforming if transformed, and summing up the (intra or inter) predicted value for those neighboring pixels.

Furthermore in this example embodiment, the motion estimation or refinement module 308 takes in the combinations of encoding parameters for each CTB in each inter-picture from one or more of the mapping modules, determines a refinement set of combinations of encoding parameters at the given spatial resolution based on the outputs of the mapping module, evaluates a cost function for each combination of encoding parameters that depends on the computed quantization parameter, and identifies the top few combinations of encoding parameters that have the lowest evaluated cost across the set of combinations. For example, the encoding parameters relevant for this module within the combination of encoding parameters include coding tree structures, a partition type of each leaf block of each coding tree, a prediction mode of each leaf block partition, such as uni-directional or bi-directional prediction, sub-pixel or full-pixel accurate motion vectors with reference to a set of reference frames for each leaf block partition, and a transform tree for each leaf block or leaf block partition.

Also in this example embodiment, the mode decision module 310 maintains strict neighbor dependencies required by the encoding format, receives the identified best combinations of encoding parameters from the intra prediction mode selection or refinement module 306 and the motion estimation or refinement module 308 for each CTB in each picture. Further, the mode decision module 310 evaluates a cost function (that depends on the computed quantization parameter) across the received combinations of encoding parameters as well as additional modes for each leaf block of the coding tree in each combination for which the decoder-side can infer the mode, motion vectors, and/or reference frames based on a signaled neighbor index, where the cost function evaluation can require intra prediction and motion compensation as well as (a) evaluation of exact encoding distortion incurred due to quantization (after transforming or in the spatial domain) and the bits required for encoding the syntax elements for the encoding format or (b) model based estimation of the encoding distortion and the bits required, for each combination of encoding parameters for each CTB.

Furthermore, the mode decision module 310 identifies the set of combinations of encoding parameters that result in the lowest cost across all the evaluated combinations for each CTB in each picture, performs the normative steps for obtaining the quantized residuals for the best combination of encoding parameters for a CTB, reconstructs the pixels by inverse quantizing the quantized residuals and inverse transforming (if residuals were forward transformed) and adding the prediction values, and performs in-loop operations, such as in-loop deblocking, sample adaptive offset, adaptive loop filtering that are selected for the encoder and supported by the encoding format, in addition, the mode decision module 310 encodes the set of combinations of encoding parameters according to the syntax and semantics of the encoding format along with the encoding of the quantized residuals according to the syntax and semantics of the encoding format to produce a media bit stream at the selected output bitrate.

Figure 3B:
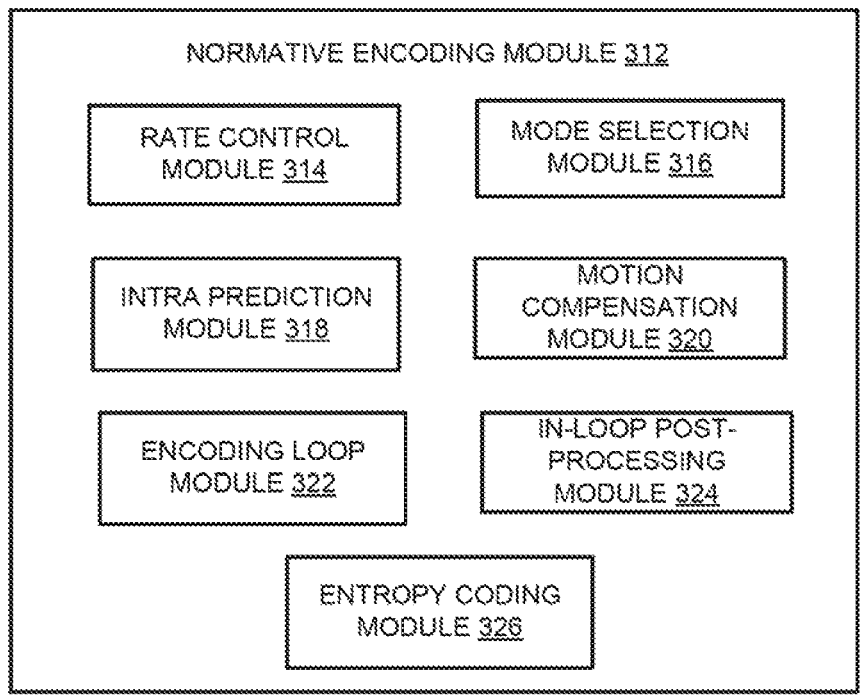
FIG. 3B is a block diagram illustrating components of a normative encoding module, shown in FIGS. 1A-1D and 2A, according to one embodiment.

Referring now to FIG. 3B, which is a block diagram 300B illustrating a normative encoding module 312 (e.g., one of the normative encoding modules 104A-N and normative encoding modules 212A-N shown in FIGS. 1A-1D and 2A, respectively). As shown in FIG. 3B, the normative encoding module 312 include a rate control module 314, a mode selection module 316, an intra prediction module 318, a motion compensation module 320, an encoding loop module 322, an in-loop post-processing module 324, and an entropy coding module 326.

In one embodiment, the rate control module 314 computes frame level and coding-tree level quantization parameters for the picture type of each picture and corresponding to the operating bitrate selected for the normative encoding module out of the output bitrates. Further, the mode selection module 316 evaluates a cost function for a set of combinations of encoding parameters derived using best combinations of encoding parameters provided by the intelligent encoding module 302 operating at the same spatial resolution to determine the best combination of encoding parameters. In one example, the mode selection module 316 performs evaluation of cost function which can be based on exact encoding distortion and exact bits required to encode (or) based on a model based estimation of distortion and bits required to encode each of the set of combinations of encoding parameters derived using the best combinations of encoding parameters for each CTB in each picture.

Furthermore, the intra prediction module 318 predicts sample values of a leaf block of the CTB based on already reconstructed neighbor samples and the selected predicted mode for the leaf block. In addition, the motion compensation module 320 computes sub-pixel accurate prediction based on attributes of a leaf block partition of a CTB, such as a sub-pixel accurate motion vector, a reference frame index, weight and offset for that reference frame index, and whether the leaf block partition is predicted from a single reference or from two references. Moreover, the encoding loop module 322 performs residual computation as a difference between the original samples and the intra-predicted or motion compensated samples, optional forward transforming of the residuals, quantization based on the selected quantization parameter, inverse quantization, inverse transform (if forward transforming of residuals was done), and addition of intra predicted or motion compensated sample values to obtain the reconstructed sample values.

Also, the in-loop post-processing module 324 performs additional optional in-loop processing steps supported by the encoding format, such as in-loop deblocking, sample adaptive offset, adaptive loop filtering, and so on. Further, the entropy coding module 326 encodes the best combination of encoding parameters for each CTB according to syntax and semantics of the encoding format along with the encoding of the quantized and suitably scanned residual coefficients to create a media bit stream at the required output bitrate.

Figure 5A:
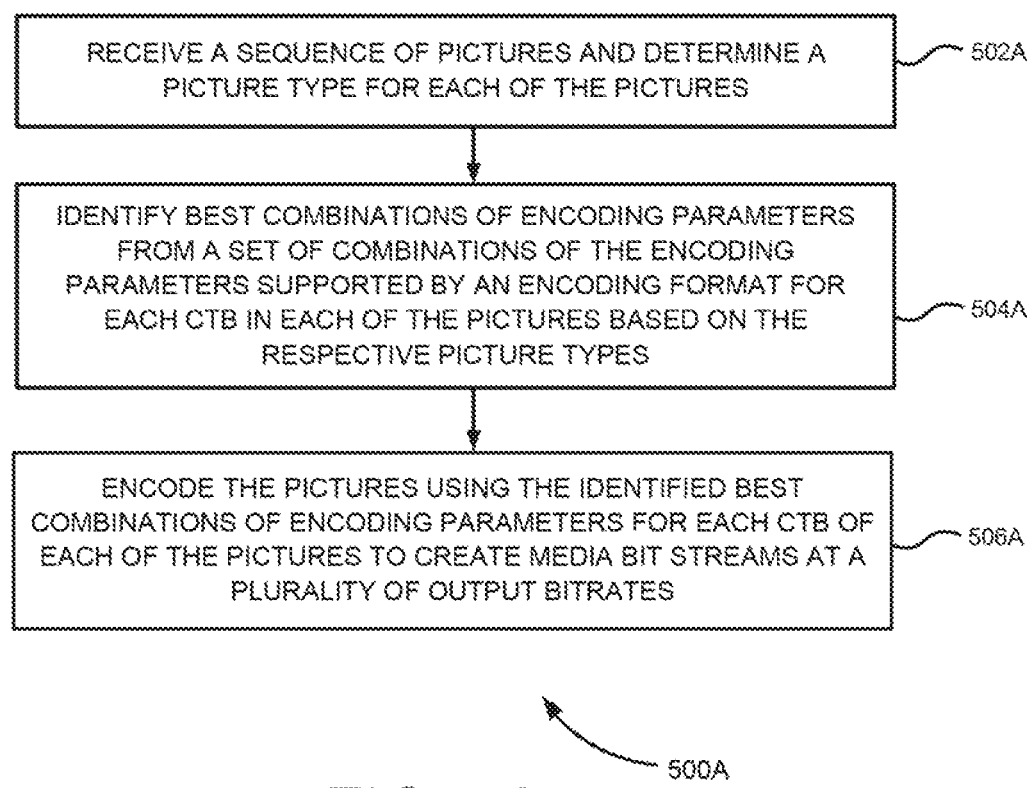
FIGS. 5A-5B are flow diagrams of methods for efficiently encoding a sequence of pictures at a given spatial resolution to an encoding format at a plurality of output bitrates and a plurality of output spatial resolutions, respectively, according to two different embodiments that can also be combined.

Referring now to FIG. 5A, which is a flow diagram 500A of a method for efficiently encoding a sequence of pictures at a given spatial resolution to an encoding format at a plurality of output bitrates, according to one embodiment. At block 502A, the pictures and a picture type for each of the pictures are received. At 504A, best combinations of encoding parameters from a determined set of combinations of the encoding parameters supported by the encoding format for each CTB in each of the pictures are identified based on the respective picture types. For example, a combination of encoding parameters for each CTB in each of the pictures is composed of is composed of one or more of, coding tree structure options, a prediction type of each leaf block of each coding tree option, a partition type of each leaf block of each coding tree option, a prediction mode within the prediction type for each partition of each leaf block partition of each coding tree option, motion vectors with respect to a set of reference pictures for each leaf block of each coding tree option, and a transform tree for each leaf block or leaf block partition of each coding tree option. At block 506A, the sequence of pictures are encoded using the best of the identified combinations of encoding parameters for each CTB of each of the pictures to create media bit streams at the plurality of output bitrates. This is explained in more detail with reference to FIGS. 1A-1D.

Figure 5B:
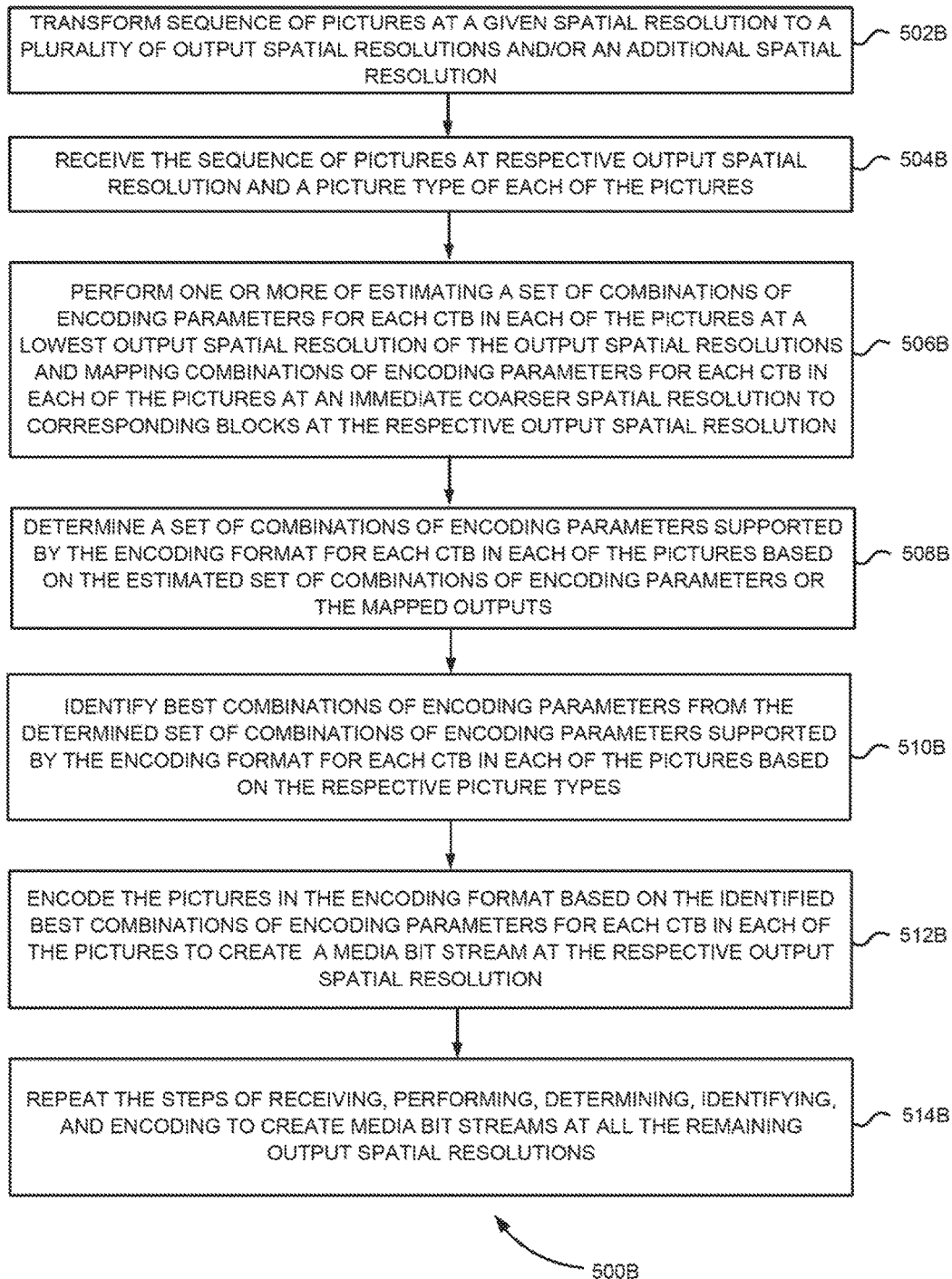

Referring now to FIG. 5B, which is a flow diagram 500B of a method for efficiently encoding a sequence of pictures at a given spatial resolution to an encoding format at a plurality of output spatial resolutions, according to one embodiment. At block 502B, the sequence of pictures at the given spatial resolution is transformed to the output spatial resolutions and/or an additional spatial resolution that is lower than the plurality of output spatial resolutions. At block 504B, the sequence of pictures at respective output spatial resolutions and a picture type for each of the pictures are received. At block 506B, one or more of estimating a set of combinations of encoding parameters for each CTB in each of the pictures at a lowest output spatial resolution of the output spatial resolutions based on the additional spatial resolution, and mapping combinations of encoding parameters for each CTB in each of the pictures at an immediate coarser spatial resolution to corresponding blocks at the respective output spatial resolution are performed. At block 508B, a set of combinations of encoding parameters supported by the encoding format for each CTB in each of the pictures is determined based on the estimated set of combinations of encoding parameters or the mapped outputs. At block 510B, best combinations of encoding parameters from the determined set of combinations of encoding parameters are identified based on the respective picture types. At block 512B, the pictures in the encoding format are encoded based on the identified best combinations of encoding parameters for each CTB in each of the pictures to create a media bit stream at the respective output spatial resolution. At block 514B, the steps of receiving, performing, determining, identifying and encoding at are repeated at each of the remaining output spatial resolutions to create a media bit stream at each of the remaining output spatial resolutions. This is explained in more detail with reference to FIG. 2.

Figure 6A:
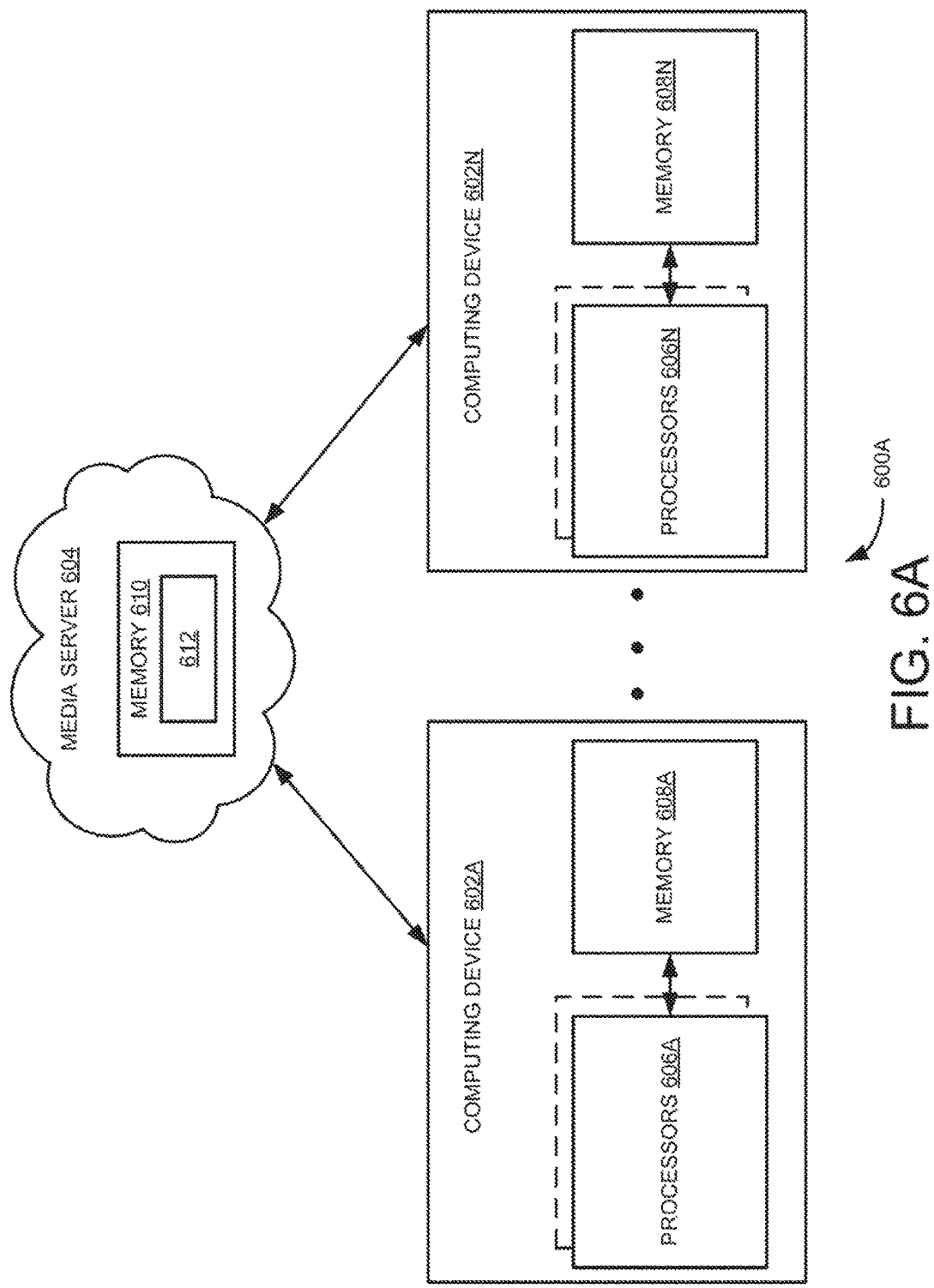

Referring now to FIG. 6A, which illustrates a system 600A for performing efficient media encoding, according to one embodiment. As shown in FIG. 6A, the system 600A includes a plurality of computing devices 602A-N that are communicatively coupled to each other. Further, the computing devices 602A-N includes one or more processors 606A-N and memories 608A-N, respectively. The efficient media encoding module 612 (e.g., 100A, 100B, 100C, 100D, 200 or 200 including 200A of FIGS. 1A-1D, 2 and 2A, respectively) can be implemented as a program (which performs the processes described in FIGS. 5A and 8B) that resides in any of the memories 608A-N or in a media server 604.

In one example embodiment, the efficient media encoding module 612 is a program that resides in the memory 610 and is executed on one or more of the processors 606A-N. For example, the memory 610 or the memories 608A-N can be a shared memory that is accessible by the computing devices 602A-N. In this example, the shared memory is accomplished through an integrated memory map visible to each of the computing devices 602A-N that are interconnected physically through either serial or parallel inter-processor inter-connects.

In other words, the shared memory can be a common random access memory (RAM) (internal or external) accessible over a shared bus, or it can be a memory mapped area that is physically accessed over a processor interconnect (e.g., Ethernet, Peripheral Component Interconnect Express (PCIe), serial rapid IO, Intel Quick-Path Interconnect™, Texas Instruments' Hyperlink™, and so on.). Further, the Efficient media encoding module 612 can run sequentially on a single processor or can be scheduled to run concurrently on a set of threads, processors, or computing devices with inter-device interconnects to access RAM associated with a remote computing devices and a memory mapping mechanism that provides a unified memory map for each computing device. The efficient media encoding module 612 includes multiple modules to perform efficient media encoding and each module itself may run on a single core or multi-cores on a single computing device or across multiple computing devices. The different modules can also run on distributed computing devices made available as part of an infrastructure-as-a-service (Iaas) offering or a private cloud infrastructure or platform-as-a-service (PaaS) offering.

Referring now to FIG. 6B, which illustrates a system 600B for performing efficient media encoding, according to one embodiment. As shown in FIG. 6B, the system 600B includes logic that is comprised of combinational circuits or sequential circuits 614A-N that are communicatively coupled to each other. Furthermore, the combinational circuits or sequential circuits 614A-N includes memories 620A-N. Further, one or more of the combinational circuits or sequential circuits 614A-N implement logical circuits 622 (e.g., 100A, 100B, 100C, 100D, 200 or 200 including 200A of FIGS. 1A-1D, 2 and 2A), with their associated memories 620A-N, for performing efficient media encoding.

As an example of the proposed technique, consider a scenario where a 1920×1080@30 fps ingested bit stream is to be encoded to an encoding format with 4 different bit-rates each at 1920×1080, 1280×720, 852×480, and 640×360. Let x be the cycles taken by an encoder without input from any mapping module to code a highest resolution. Let y be the cycles taken by a normative encoding module to code the highest resolution. Let z be the cycles taken by an intelligent encoding module. The computational complexity reduction with the proposed arrangement compared to brute-force encoding of all the streams would be:

$$1.75*4*x \text{ (for the brute-force encoding) vs. } 1.75*(z+3*y)$$

(where 1.75 is the approximately the ratio between the total number of pixels across all resolutions relative to the number of pixels at 1920×1080 resolution)

$$\text{Computational savings factor}=(4x)/(z+3y)$$

For typical medium to high quality encoders, x=5y, and z=2.5y. For these values, the computational savings factor becomes (20)/(5.5)=3.6. In other words, 4 streams are encoded at roughly the same computational complexity that it would take to do one brute-force re-encoding.

In various embodiments, the systems and methods described in FIGS. 1 through 6 propose a technique for efficient multi-bitrate and multi-spatial resolution media encoding that aims to get significant reduction in computational complexity over existing independent encoding of the sequence of pictures. The proposed technique also works with both simulcast (coding of multiple resolution and multiple bit-rates at each resolution as independently decodable streams) and scalable representations (coding of multiple resolutions and multiple bit-rates at each resolution as a set of dependent streams).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system for encoding a sequence of pictures at a given spatial resolution to an encoding format at a plurality of output spatial resolutions, comprising:
    a media transformation module (MTM) that transforms the sequence of pictures at the given spatial resolution to the plurality of output spatial resolutions and/or an additional spatial resolution that is lower than the plurality of output spatial resolutions;
    an estimation module that estimates, at the additional spatial resolution, a set of combinations of encoding parameters for each coding tree block (CTB) in each of the pictures at a lowest output spatial resolution among the plurality of output spatial resolutions;
    a set of coarse-to-fine mapping modules, one for each of the plurality of output spatial resolutions other than the lowest output spatial resolution, that map combinations of encoding parameters for each CTB in each of the pictures at an immediate coarser spatial resolution to corresponding blocks at their respective output spatial resolution; and
    a set of intelligent encoding modules, one for each of the plurality of output spatial resolutions, each of which receives the sequence of pictures and a picture type for each of the pictures at the respective output spatial resolution, determines a set of combinations of encoding parameters for each CTB in each of the pictures supported by the encoding format for the associated picture type based on outputs of at least one of the estimation module and the respective one of coarse-to-fine mapping modules, identifies best combinations of encoding parameters for each CTB in each of the pictures from the determined set of combinations of encoding parameters for the associated picture type, and, encodes the pictures in the encoding format based on the best of the identified combinations of encoding parameters for each CTB in each of the pictures to create a media bit stream at a desired output bitrate at the respective output spatial resolution.

2. The system of claim 1, further comprising:
    a set of normative encoding modules, one for each of other desired output bitrates at each of the plurality of output spatial resolutions, each of which receives the sequence of pictures at the respective output spatial resolution, their determined picture types, and the identified best combinations of encoding parameters for each CTB in each of the pictures from the respective one of the set of intelligent encoding modules and encodes in the encoding format each CTB in each of the pictures atone combination of encoding parameters derived using the identified best combinations of encoding parameters for each CTB in each of the pictures to create a media bit stream at the respective output spatial resolution.

3. The system of claim 1, wherein each of the set of intelligent encoding modules is configured to:
    evaluate a cost function that depends on the desired output bitrate at the respective output spatial resolution, for each combination of encoding parameters for each CTB in each of the pictures in the determined set of combinations of encoding parameters supported by the encoding format for the associated picture type; and
    identify the best combinations of encoding parameters for each CTB in each of the pictures from the set of combinations of encoding parameters based on the evaluated cost function.

4. The system of claim 1, wherein the MTM, the estimation module, the set of coarse-to-fine mapping modules and the set of intelligent encoding modules are programs that reside in a memory and are executed by one or more processors or sets of logical circuits that are implemented using combinational circuits and/or sequential circuits, with their associated memories.

5. The system of claim 4, wherein the associated memories and program memory are shared memories that are accessible by one or more computing devices comprising the one or more processors or sets of logical circuits.

6. The system of claim 5, wherein the shared memory is accomplished through an integrated memory map visible to each of the one or more computing devices that are interconnected physically through either serial or parallel interprocessor inter-connects.

7. The system of claim 1, wherein a particular combination of encoding parameters for each CTB in each of the pictures is composed of one or more of, coding tree structure options, a prediction type of each leaf block of each coding tree, a partition type of each leaf block of each coding tree, a prediction mode within the prediction type for each partition of each leaf block partition of each coding tree, motion vectors with respect to a set of reference pictures for each leaf block of each coding tree, and a transform tree for each leaf block or leaf block partition of each coding tree.

8. The system of claim 1, further comprising at least one of:
a format-to-format mapping module that maps a set of coding parameters available for each CTB in the sequence of pictures in a certain input encoding format to a set of encoding parameters supported by the encoding format; and
a fine-to-coarse mapping module that receives combinations of encoding parameters for each CTB in each of the pictures at a higher spatial resolution than the given spatial resolution and maps the received combinations of encoding parameters to corresponding blocks at the given resolution.

9. The system of claim 8, wherein the set of intelligent encoding modules determines the set of combinations of encoding parameters supported by the encoding format for the associated picture type based on the outputs of at least one of the coarse-to-fine mapping module, the estimation module, the format-format mapping module, and the fine-to-coarse mapping module.

10. The system of claim 8, wherein the set of coding parameters available for each coding tree block in the sequence of pictures in a certain input encoding format is comprised of one or more coding tree structure options, a prediction type of each leaf block of each coding tree, a partition type of each leaf block of each coding tree, a quantization parameter for each leaf block of each coding tree, a header bits value for each leaf block of each coding tree, a residual coding bits value for each leaf block of each coding tree, a prediction mode within the prediction type for each partition of each leaf block partition of each coding tree, motion vectors with respect to a set of reference pictures for each leaf block of each coding tree, and a transform tree for each leaf block or leaf block partition of each coding tree.

11. A method for encoding a sequence of pictures at a given spatial resolution to an encoding format at a plurality of output spatial resolutions, comprising:
transforming the sequence of pictures at the given spatial resolution to the plurality of output spatial resolutions and/or an additional spatial resolution that is lower than the plurality of output spatial resolutions;
receiving the sequence of pictures and a picture type for each of the pictures at respective output spatial resolutions;
performing at least one of estimating a set of combinations of encoding parameters for coding tree blocks (CTBs) in each of the pictures at a lowest output spatial resolution among the plurality of output spatial resolutions based on the additional spatial resolution, and, mapping combinations of encoding parameters for each CTB in each of the pictures at an immediate coarser spatial resolution to corresponding blocks at the respective output spatial resolution;
determining a set of combinations of encoding parameters for each CTB in each of the pictures supported by the encoding format for the associated picture type based on at least one of the estimated set of combinations of encoding parameters for each CTB in each of the pictures, and, the mapped combinations of encoding parameters for each CTB in each of the pictures;
identifying best combinations of encoding parameters from the determined set of combinations of encoding parameters for each CTB in each of the pictures supported by the encoding format for the associated picture type; and
encoding the sequence of pictures in the encoding format based on the best of the identified combinations of encoding parameters for each CTB in each of the pictures to create media bit streams at the plurality of output spatial resolutions.

12. The method of claim 11, wherein a particular combination of encoding parameters for each CTB in each of the pictures is composed of one or more of, coding tree structure options, a prediction type of each leaf block of each coding tree, a partition type of each leaf block of each coding tree, a prediction mode within the prediction type for each partition of each leaf block partition of each coding tree, motion vectors with respect to a set of reference pictures for each leaf block of each coding tree, and a transform tree for each leaf block or leaf block partition of each coding tree.

13. The method of claim 11, wherein identifying the best combinations of encoding parameters from the determined set of combinations of encoding parameters for each CTB in each of the pictures, comprises:
evaluating a cost function for each combination of encoding parameters in the set of combinations of encoding parameters for each CTB in each of the pictures supported by the encoding format for the associated picture type; and
identifying the best combinations of encoding parameters for each CTB in each of the pictures from the set of combinations of encoding parameters based on the evaluated cost function.

14. A non-transitory computer-readable storage medium having instructions that, when executed by a computing device, cause the computing device to:
transform a sequence of pictures at a given spatial resolution to a plurality of output spatial resolutions and/or an additional spatial resolution that is lower than the plurality of output spatial resolutions;
receive the sequence of pictures and a picture type for each of the pictures at respective output spatial resolutions;
perform at least one of estimating at the additional spatial resolution a set of combinations of encoding parameters for coding tree blocks (CTBs) in each of the pictures at a lowest output spatial resolution among the plurality of output spatial resolutions and mapping combinations of encoding parameters for each CTB in each of the pictures at an immediate coarser spatial resolution to corresponding blocks at the respective output spatial resolution;
determine a set of combinations of encoding parameters supported by an encoding format for each CTB in each of the pictures based on at least one of the estimated set of combinations of encoding parameters for each CTB in each of the pictures and the mapped combinations of encoding parameters;

identify best combinations of encoding parameters from the determined set of combinations of encoding parameters for each CTB in each of the pictures supported by the encoding format for the associated picture type; and encode the sequence of pictures in the encoding format based on the best of the identified combinations of encoding parameters for each CTB in each of the pictures to create media bit streams at the plurality of output spatial resolutions.

15. The non-transitory computer-readable storage medium of claim 14, wherein a particular combination of encoding parameters for each CTB in each of the pictures is composed of one or more of, coding tree structure options, a prediction type of each leaf block of each coding tree, a partition type of each leaf block of each coding tree, a prediction mode within the prediction type for each partition of each leaf block partition of each coding tree, motion vectors with respect to a set of reference pictures for each leaf block of each coding tree, and a transform tree for each leaf block or leaf block partition of each coding tree.

16. The non-transitory computer-readable storage medium of claim 14, wherein the instructions further cause the computing device to:

evaluate a cost function for each combination of encoding parameters in the set of combinations of encoding parameters for each CTB in each of the pictures supported by the encoding format for the associated picture type; and identify the best combinations of encoding parameters for each CTB in each of the pictures from the set of combinations of encoding parameters based on the evaluated cost function.

* * * * *